(12) United States Patent
Pisupati et al.

(10) Patent No.: US 8,166,116 B2
(45) Date of Patent: Apr. 24, 2012

(54) AUTOMATIC DISTRIBUTION OF CORRECTIVE CONFIGURATION INFORMATION

(75) Inventors: Ravikumar Pisupati, San Jose, CA (US); Krishnam Raju Datla, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 700 days.

(21) Appl. No.: 11/862,204

(22) Filed: Sep. 27, 2007

(65) Prior Publication Data

US 2009/0089376 A1    Apr. 2, 2009

(51) Int. Cl.
  *G06F 15/16* (2006.01)
(52) U.S. Cl. ........................................ 709/206
(58) Field of Classification Search .............. 709/223, 709/206
  See application file for complete search history.

(56) References Cited

U.S. PATENT DOCUMENTS

| | | | | |
|---|---|---|---|---|
| 5,813,007 | A * | 9/1998 | Nielsen | 709/206 |
| 7,024,450 | B1 | 4/2006 | Deo et al. | |
| 2002/0156797 | A1 * | 10/2002 | Lee et al. | 707/200 |
| 2004/0249934 | A1 * | 12/2004 | Anderson et al. | 709/224 |
| 2005/0160330 | A1 * | 7/2005 | Embree et al. | 714/57 |
| 2006/0031532 | A1 * | 2/2006 | Sanders | 709/227 |
| 2006/0259272 | A1 * | 11/2006 | Sattler et al. | 702/181 |
| 2007/0027965 | A1 | 2/2007 | Brenes et al. | |
| 2007/0038720 | A1 * | 2/2007 | Reding et al. | 709/217 |
| 2008/0046786 | A1 * | 2/2008 | Patel et al. | 714/100 |
| 2008/0126110 | A1 * | 5/2008 | Haeberle et al. | 705/1 |
| 2008/0168167 | A1 * | 7/2008 | Calrson et al. | 709/224 |
| 2008/0262860 | A1 * | 10/2008 | Schneider et al. | 705/1 |
| 2009/0125475 | A1 * | 5/2009 | Rhoads et al. | 706/60 |

* cited by examiner

*Primary Examiner* — Ajay Bhatia
(74) *Attorney, Agent, or Firm* — P. Su

(57) ABSTRACT

Methods and apparatus for allowing a central network manager to distribute corrective configuration information to customers using e-mail are disclosed. According to one aspect of the present invention, a method includes determining if an issue is reported by a first customer system that supports a first device. The issue is associated with the first device. The method also includes obtaining updating information if the issue is reported by the first customer system, and providing the updating information to the first customer system. The first customer system is arranged to distribute the updating information to the first device and to cause the updating information to be implemented on the first device.

18 Claims, 5 Drawing Sheets

AUTOMATIC DISTRIBUTION OF CORRECTIVE CONFIGURATION INFORMATION

BACKGROUND OF THE INVENTION

The present invention relates generally to network management.

Many network service providers utilize network managers to monitor and configure parameters associated with customer sites. For example, a service provider may use a network manager to monitor and to configure device parameters for devices such as networking devices and Internet Protocol (IP) phones used at customer sites. In the course of monitoring devices and IP phones used at customer sites, a service provider may become aware that there are configuration issues at a particular customer site. Typically, the service provider may become aware of a configuration issue when a customer site alerts the service provider of a problem. The service provider then manually provides the customer site with a solution to the problem, generally by opening a virtual private network (VPN) connection to the customer site, selecting a device for which the solution is needed, and implementing the solution.

BRIEF DESCRIPTION OF THE DRAWINGS

The invention will be readily understood by the following detailed description in conjunction with the accompanying drawings, wherein like reference numerals designate like structural elements, and in which.

DESCRIPTION OF EXAMPLE EMBODIMENTS

General Overview

Figure 1:
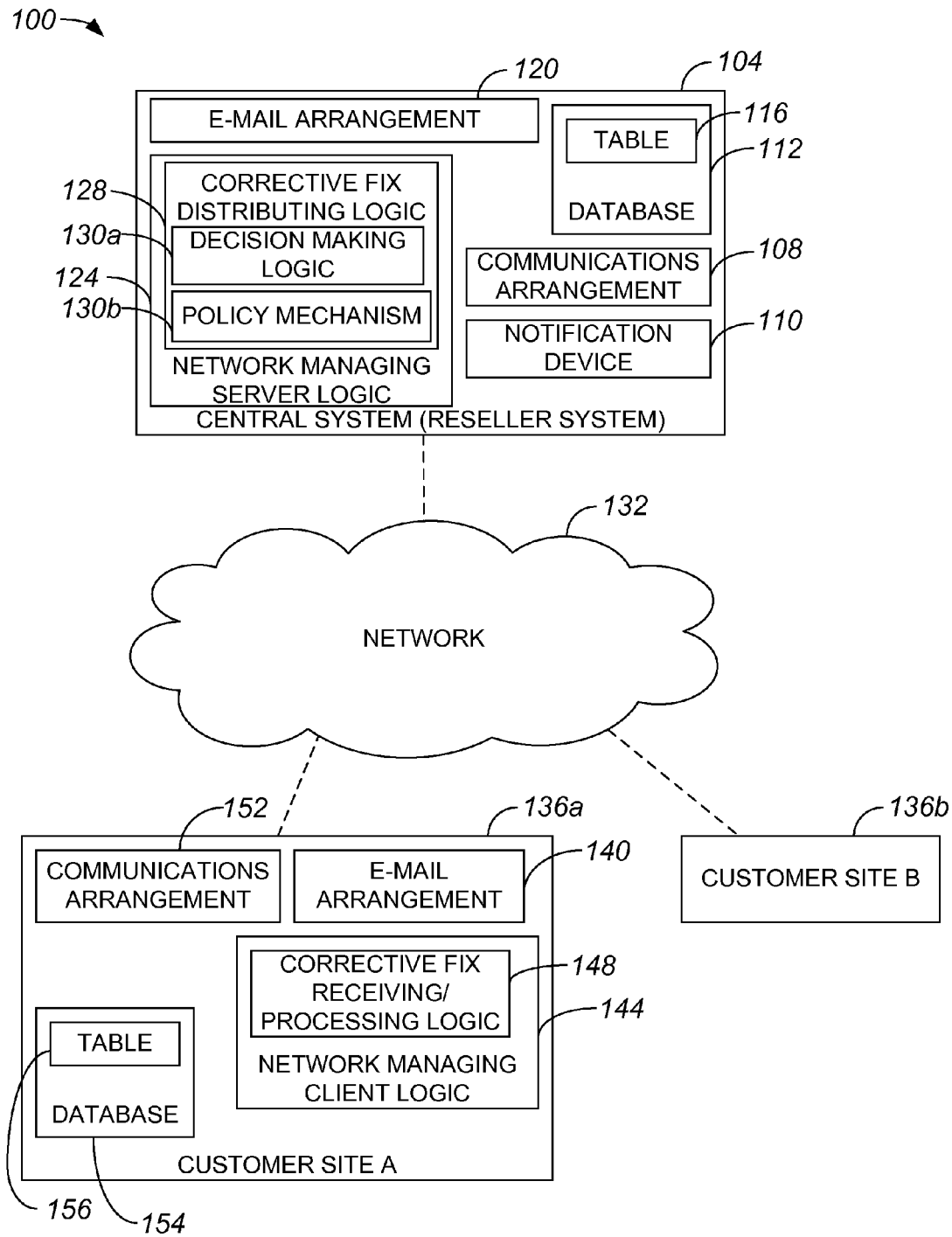
FIG. 1 is a diagrammatic representation of an overall system in which a central site may provide corrective information to a customer site using an e-mail mechanism in accordance with an embodiment of the present invention.

In one embodiment, a method includes determining if an issue is reported by a first customer system that supports a first device. The issue is associated with the first device. The method also includes obtaining updating information if the issue is reported by the first customer system, and providing the updating information to the first customer system. The first customer system is arranged to distribute the updating information to the first device and to cause the updating information to be implemented on the first device.

Description

The use of network management applications allows network monitoring and element management to be provided to customers, as for example those in small to mid-sized business customers. Such applications, such as the Cisco Monitor Manager and the Cisco Monitor Director available from Cisco Systems, Inc., of San Jose, Calif., may be used by service providers to provide centralized monitoring of customer systems or customer network devices. Service providers may operate central systems that allow them to monitor and to provide configuration information to their clients or customers. When configuration information associated with customer network equipment becomes inaccurate or ineffective such that a correction may be warranted, the central systems are arranged to provide corrective configuration information to customers.

In one embodiment, central systems may be configured to "push out" or substantially automatically provide corrective configuration information or a corrective policy to a customer. The customer may then identify devices within its network to which the corrective configuration information is to be distributed. The corrective configuration information may be provided to the customer substantially without utilizing a virtual private network (VPN) connection. The corrective configuration information may be arranged in an e-mail message, and then sent to an address associated with an appropriate customer, e.g., a customer that effectively made a request for the corrective configuration information. The corrective configuration information may be sent using secure e-mail commands associated with substantially any suitable mail transfer mechanism, e.g., a simple mail transfer protocol (SMTP) or POP.

Additionally, the corrective configuration information may be dynamically identified by a central system in response to a request from a customer, and to dynamically determine which customers may find the configuration information to be relevant to devices operating in their associated networks. That is, a central system may be configured to determine what corrective configuration information to distribute when the corrective configuration information is needed, and to dynamically identify which devices in customer networks may benefit from the corrective configuration information.

Allowing a central system to determine what corrective information or, more generally, updated information to distribute, and to which devices the information is to be distributed, allows the information to be efficiently distributed such that substantially any devices which may derive a benefit from the information may efficiently obtain the corrective information. Distributing such information using e-mail, rather than dedicated connections such as VPN connections, is efficient as there is effectively no overhead associated with opening and maintaining VPN connections with specific devices or to a customer site. Further, using e-mail, multiple customers may receive corrective information at substantially the same time.

Referring initially to FIG. 1, an overall system within which a central system operated by a service provider may send corrective configuration information or updates to at least one device associated with a customer without utilizing a VPN connection will be described in accordance with an embodiment of the present invention. An overall system 100 includes a central system 104 and a plurality of customer sites 136a, 136b. Central system 104 may generally be in communication with customer sites 136a, 136b through a network 132.

Central system 104, which may be a network manager or a network manager application, includes a communications arrangement 108 that allows for communications with customer sites 136a, 136b. Communications arrangement 108 may include communications ports that are arranged to receive and to transmit information across network 132. By way of example, communications arrangement 108 may receive a request for a corrective fix and transmit corrective configuration information. Communications arrangement 108 may include functionality associated with security features. For instance, communications arrangement 108 may be arranged to provide for secure communications at both an overall system level and at a correction level. That is, communications arrangement 108 may effectively ensure that corrective action is secure and that connections with customer sites 136a, 136b are secure.

Central system 104 also includes network managing server logic 124 that is configured to allow central system 104 to monitor customer sites 136a, 136b. Network managing server logic 124 includes hardware logic and/or executable software logic that is embodied in one or more tangible media. Corrective fix distributing logic 128 is included in network managing server logic 124, and is arranged to process information pertaining to a problem experienced by a customer 136a, 136b and to identify or otherwise obtain an appropriate corrective fix for the problem. Identifying an appropriate corrective fix may include searching a database 112 or, more particularly, a table 116 in database 112 to identify a corrective fix that is suitable for the problem. It should be appreciated that a corrective fix may be obtained from substantially any suitable location, e.g., any secure location that contains common fixes.

Corrective fix distribution logic 128 may include decision making logic 130a, or logic which enables a determination of which customer sites 136a, 136b are to receive a corrective fix, and a determination of when corrective fixes may be distributed. A policy mechanism 130b may be included in corrective fix distributing logic 128 to effectively implement policies that are associated with the distribution of corrective fixes.

In one embodiment, corrective fix distributing logic 128 may be arranged to identify appropriate devices at customer sites 136a, 136b to which to provide the appropriate corrective fix or information. Information pertaining to the appropriate devices may be provided in the request for a corrective fix. Additionally, information pertaining to devices and their associated configurations may be obtained from database 112. It should be appreciated, however, that corrective fix distributing logic 128 are typically arranged to provide an appropriate corrective fix to customer sites 136a, 136b, which may then be responsible for distributing those fixes to appropriate devices associated therewith. Such distribution may be based on policies or other methods.

An e-mail arrangement 120 cooperates with network managing server logic 124 to generate e-mail that contains a corrective fix or information, and to distribute the e-mail to appropriate customers 136a, 136b. A notification device 110 such as a display console is arranged to display information pertaining to customer sites 136a, 136b, e.g., information relating to problems experienced by devices associated with customer sites 136a, 136b. Notification device 110 is not limited to being a display console. By way of example, notification device 110 may be substantially any device that is suitable for alerting a network administrator of problems experienced at customer sites 136a, 136b.

Customer site 136a, which may have within its domain a plurality of network devices (not shown), includes a communications arrangement 152 that allows customer site 136a to communicate across network 132 to central system 104. An e-mail arrangement 140 is arranged to receive e-mails, as for example e-mails from central system 104 that contain or otherwise identify corrective fixes or information. Network managing client logic 144 allows central system 104 to monitor customer site 136a or, in one embodiment, devices (not shown) that are associated with customer site 136a. Network managing client logic 144 includes corrective fix receiving/processing logic 148 that allows customer site 136a to identify corrective fixes contained in e-mails received from central system 104, and to process such corrective fixes. Processing corrective fixes may include implementing the corrective fixes. It should be appreciated that processing a corrective fix may also include identifying devices (not shown) within customer site 136a that may benefit from the corrective fix, and sending the corrective fix to the devices. Typically, however, central system 104 generally sends the corrective fix to customer site 136a, and not substantially directly to appropriate devices within customer site 136a.

In general, corrective fix receiving/processing logic 148 may include logic that allows policies to be implemented and decisions to be made. By way of example, corrective fix receiving/processing logic 148 may be arranged to implement policies that indicate which corrective fixes to accept and how to distribute such corrective fixes to devices (not shown) associated with customer site 136a. Further, corrective fix receiving/processing logic 148 may be configured to make decisions regarding the acceptance and subsequent implementation of corrective fixes.

An optional database 154 with a table 156 may be included in customer site 136a. Database 154 is arranged to allow devices (not shown) associated with customer site 136a to substantially locally obtain corrective fixes. By way of example, subscribers to customer site 136a may search database 154 or, more specifically, table 156 upon needing a corrective fix to determine if a corrective fix is available. Customer site 136a may first access database 154 to determine if a corrective fix is available for a particular problem before notifying central system 104 of the particular problem. It should be appreciated that table 156 may be updated by customer site 136a when corrective fixes are obtained. Alternatively, table 156 may be updated by central system 104.

Figure 2A:
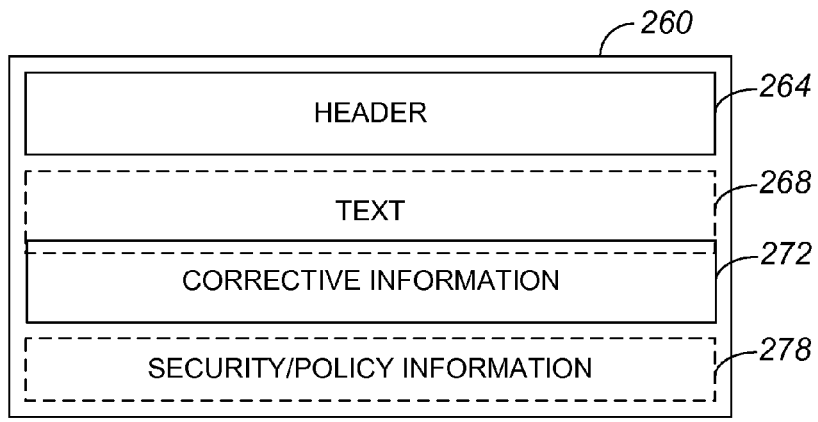
FIG. 2A is a diagrammatic representation of an e-mail in which corrective information is inlined into the e-mail in accordance with an embodiment of the present invention.

The format of an e-mail that contains a corrective fix or corrective information may vary widely. FIG. 2A is a diagrammatic representation of one example of an e-mail in which a corrective fix or corrective information is inlined into the e-mail in accordance with an embodiment of the present invention. An e-mail 260 may include a header 264 which contains information relating to the originator or the source of the e-mail. Such information may include security information that may be used to ascertain the authenticity of e-mail 260. Ascertaining the authenticity of e-mail 260 allows for a determination to be made regarding the trustworthiness of the source of the e-mail and/or the legitimacy of the e-mail.

E-mail 260 also includes corrective information 272, and may also include text 268. In one embodiment, text 268 may include corrective information 272. That is, corrective information 272 may be presented as text or character strings that may be read by a receiver of e-mail 260 and/or copied by the receiver of e-mail 260 into an appropriate file. By way of example, if a system administrator receives e-mail 260 and corrective information 272 includes a "bug fix" for a computer program, the system administrator may copy corrective information 272 substantially directly into the computer program. Corrective information 272 may include but is not limited to including, commands that enable a receiver to troubleshoot an appropriate device within a customer network and information such as a bug fix that is suitable for correcting a problem on the appropriate device.

Optionally, e-mail 260 may also include security and policy information 278. Security and policy information 278 may specify, but is not limited to specifying, security levels, indications associated with secure message exchanges, and policies associated with the distribution or implementation of corrective information 272.

Figure 2B:
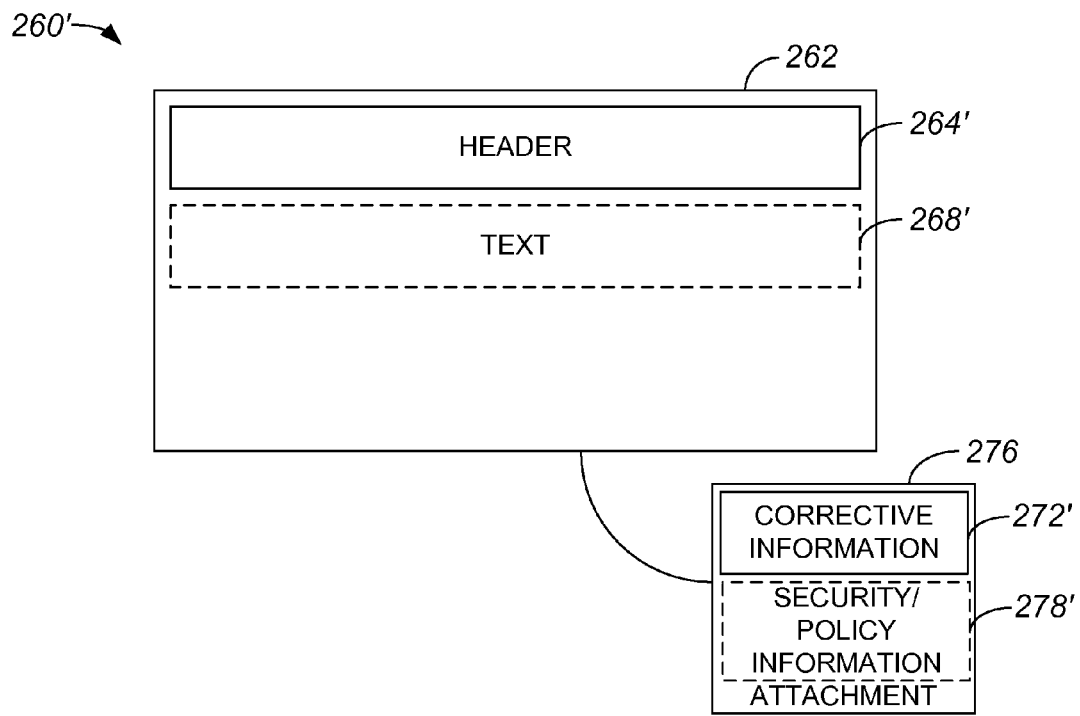
FIG. 2B is a diagrammatic representation of an e-mail in which corrective information is substantially attached to the body of an e-mail in accordance with an embodiment of the present invention.

In lieu of substantially inlining corrective information into an overall e-mail, corrective information may be provided as an attachment to an e-mail. FIG. 2B is a diagrammatic representation of an e-mail in which corrective information is substantially attached to the body of an e-mail in accordance with an embodiment of the present invention. An e-mail 260' includes a body 262 that contains a header 264' and, optionally, text 268. E-mail 260' also includes an attachment 276 to body 262. Attachment 276 contains corrective information 272' and, optionally, security/policy information 278'. The configuration of attachment 276 may vary widely. For instance, attachment 276 may be a text file, an executable file that may be executed to effectuate a correction for a problem, or an application file that may be provided to an application for which corrective information is desired.

Figure 2C:
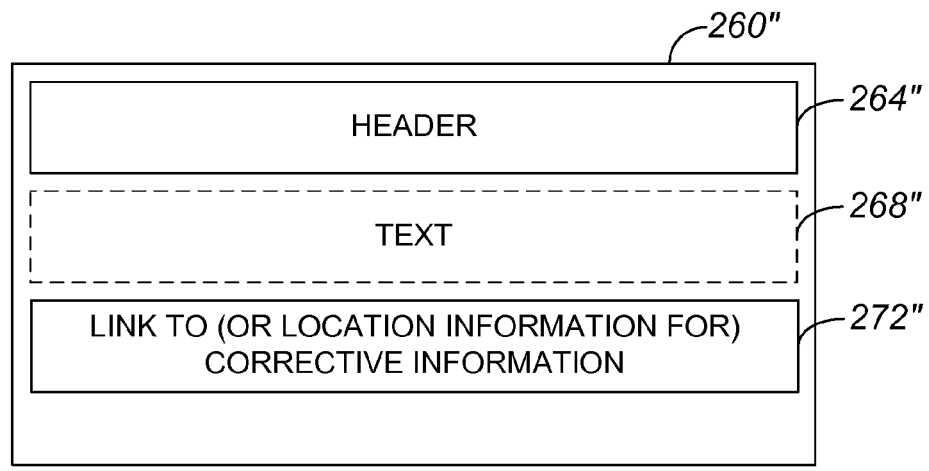
FIG. 2C is a diagrammatic representation of an e-mail in which a link to, or a location of, corrective information is provided in accordance with an embodiment of the present invention.

Corrective information may also be provided on a website, for example, associated with a central system. If corrective information or a solution to a problem is detailed on a website, an e-mail may include a link, e.g., a universal resource locator (URL) address, that identifies a webpage from which the corrective information may be obtained. FIG. 2C is a diagrammatic representation of an e-mail in which a link to, or a location of, corrective information is provided in accordance with an embodiment of the present invention. An e-mail 260" includes a header 264" and a link 272" to corrective information, and may include text 268". Link 272" may be a "live" link such that a receiver of e-mail 260" may use a user interface device, e.g., a mouse, to "click on" link to effectively cause the webpage associated with link 272" is substantially automatically displayed. Alternatively, link 272" may be a string of characters that a user may type of copy into a web browser to cause the webpage associated with link 272" to be displayed.

Figure 3:
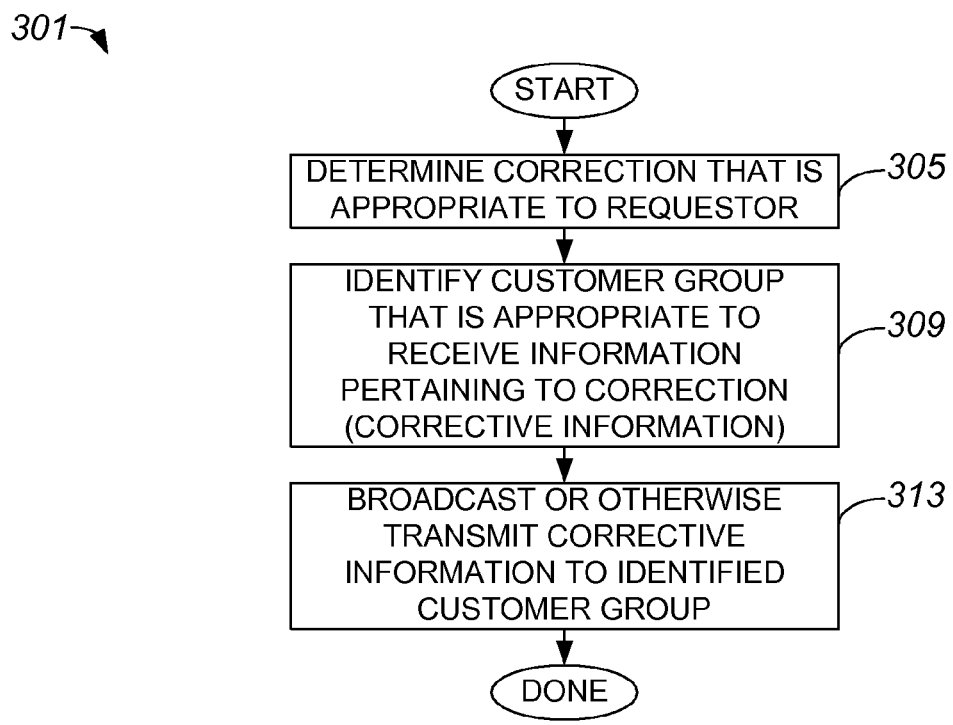
FIG. 3 is a process flow diagram which illustrates one method of distributing corrective information generated as a result of a request, such as a fault notification, for corrective information in accordance with an embodiment of the present invention.

An e-mail such as those of FIGS. 2A-C may be generated and distributed by a central system in response to a request for corrective information. A central system, as for example a central system that includes a network manager, may send corrective information to a requestor, i.e., a customer that reported a particular problem. Alternatively, a central system may effectively broadcast the corrective information to the requestor as well as other customers such that the customers may proactively implement corrections or fixes on their systems. The corrective information may be broadcast to substantially all customers associated with the central system, or may be broadcast to substantially only to customers to whom the corrective information is likely to be relevant. FIG. 3 is a process flow diagram which illustrates one method of distributing corrective information, e.g., a fix or a solution to a particular problem, as a result of a request for corrective information in accordance with an embodiment of the present invention. A process 301 of distributing corrective information begins at step 305 in which a central system or network manager determines a correction that is appropriate to a requestor. That is, the central system identifies a correction that may solve a problem that a requestor or customer system is experiencing.

After a correction that is appropriate to the requestor is determined, the central system identifies a customer group that is appropriate to receive the information pertaining to the correction in step 309. In general, the customer group includes the requestor. It should be appreciated that in some instances, the customer group may include substantially only the requestor. When a customer group that is appropriate to receive corrective information is a subset of all customers associated with the central system, e.g., when the corrective information is not to be automatically broadcast to substantially all customers associated with the central system, the central system may search databases containing customer information to dynamically determine which customers may benefit from receiving the corrective information. By way of example, if a correction relates to a particular operating system, the customer group may include substantially only those customers of the central system that include devices which run the particular operating system. Identifying a customer group may include identifying specific devices associated with a customer that are likely to derive a benefit from the corrective information.

Once a customer group is identified in step 309, the central system broadcasts or otherwise transmits the corrective information to the customer group in step 313. In the described embodiment, the central system may broadcast an e-mail that is addressed to the customers in the customer group. The process of distributing corrective information is completed upon the broadcast of corrective information.

Figure 4:
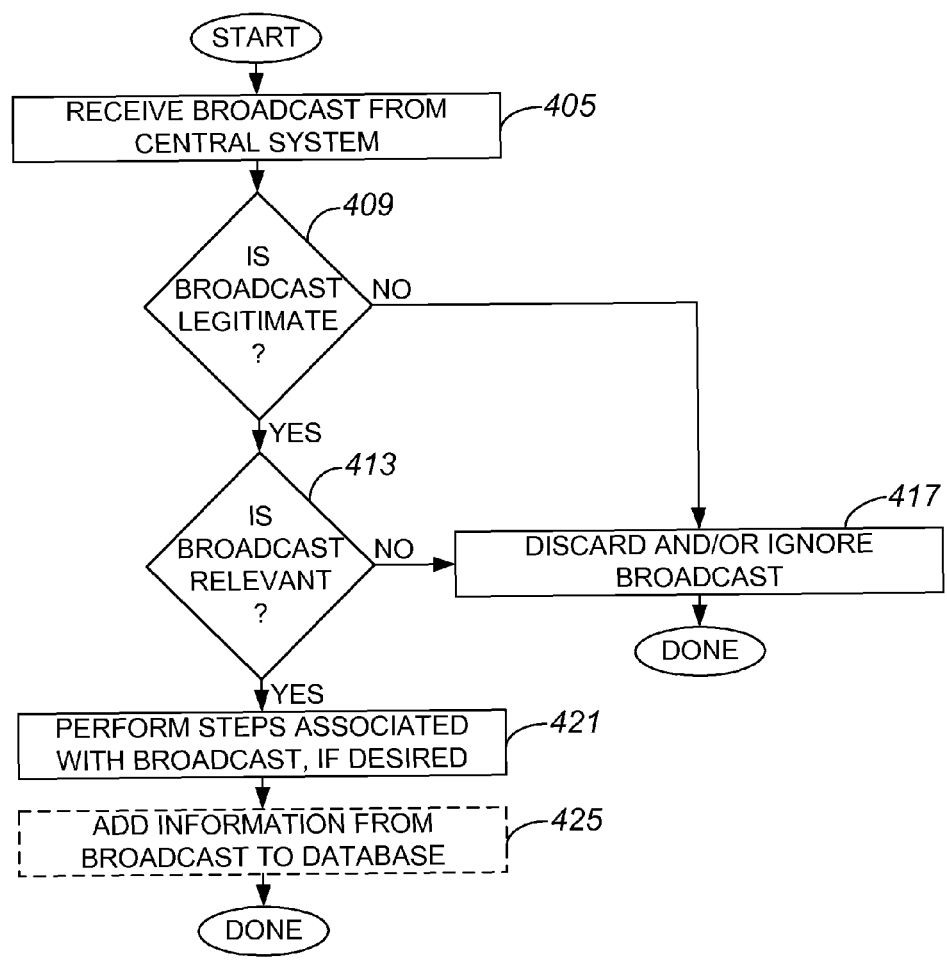
FIG. 4 is a process flow diagram which illustrates one method of receiving corrective information that is broadcasted in accordance with an embodiment of the present invention.

With reference to FIG. 4, one method of processing a broadcast, e.g., a broadcast received from a central system, that includes corrective information will be described in accordance with an embodiment of the present invention. A method 401 of processing a broadcast begins at step 405 in which a broadcast is received by a customer from a central system. The broadcast is typically an e-mail that contains the corrective information either inline, as an attachment, or as a link.

A determination is made in step 409 regarding whether the broadcast is legitimate. Determining whether the broadcast is legitimate may include, but is not limited to including, identifying whether the broadcast originated from, or was otherwise received from, a trusted source. In one embodiment, the customer may effectuate a check of whether a security feature associated with the broadcast matches that of a trusted source, e.g., the central system. Such a check may be performed by effectively executing security software on a computing system associated with the customer.

If it is determined in step 409 that the broadcast is not legitimate, then process flow moves to step 417 in which the customer discards and/or ignores the broadcast. After the customer discards and/or ignores the broadcast, the processing of a broadcast is completed. Alternatively, if it is determined in step 409 that the broadcast is legitimate, a determination is then made in step 413 as to whether the broadcast is relevant to the customer. That is, the customer ascertains whether the corrective information contained in the broadcast applies to the systems operated by, or the applications executed by, the customer.

If the determination in step 413 is that the broadcast is not legitimate, the customer discards and/or ignores the broadcast in step 417, and the processing of a broadcast is completed. If, however, the determination in step 413 is that the broadcast is relevant, the implication is that the correction that is effectively described in the broadcast is potentially applicable to the customer. Accordingly, in step 421, steps associated with the broadcast, e.g., steps outlined in the broadcast, may be performed, if desired. In other words, the customer may elect to implement the procedure that is essentially described in the broadcast. Then, in step 425, a database that is local to the customer may be updated if such a database is maintained. For example, information relating to corrective steps which may be taken to resolve a problem may be stored locally in a database if the customer has a policy to attempt to resolve problems itself before contacting a central system. Once the steps associated with the broadcast are performed, if desired, and/or once information associated with the broadcast is stored into a database, the processing of a broadcast is completed.

Figure 5:
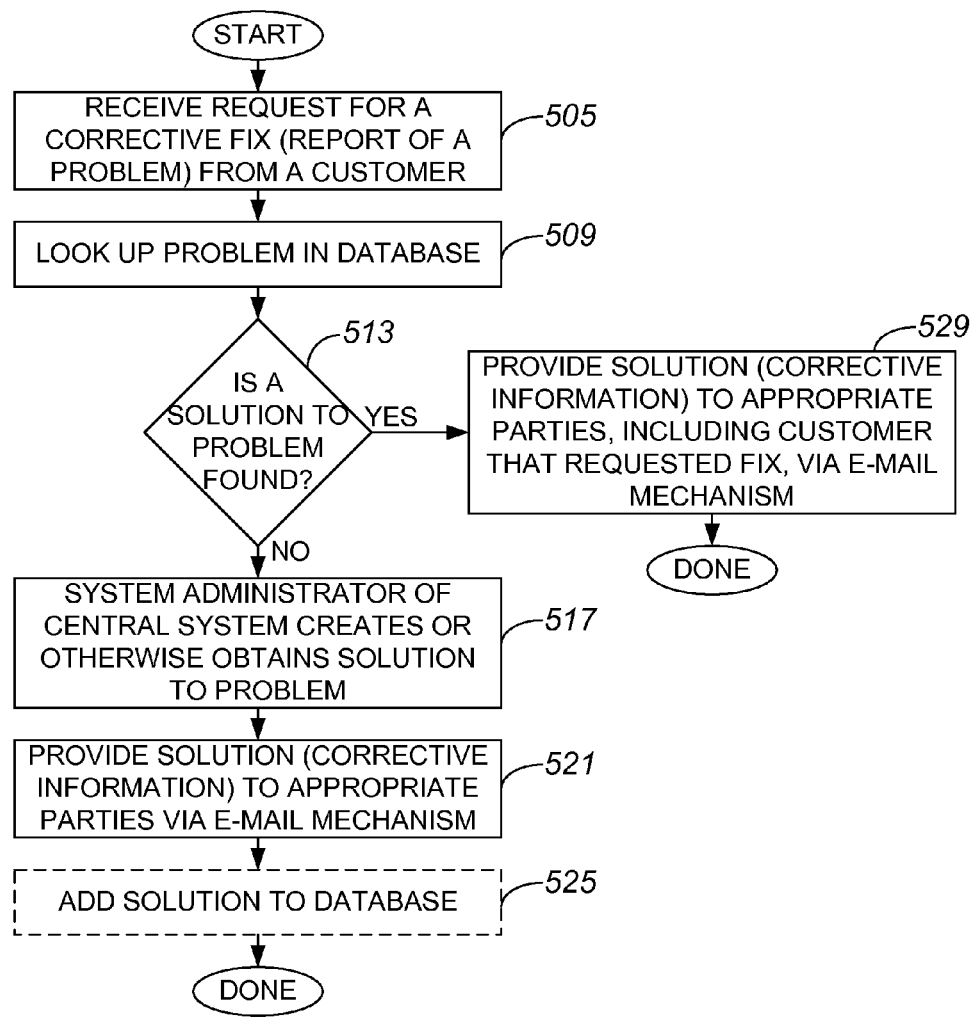
FIG. 5 is a process flow diagram which illustrates one method of processing a request for corrective information from the point-of-view of a central system in accordance with an embodiment of the present invention.

A solution to a particular problem may be stored in a table within a database such that given the problem, the appropriate solution may be relatively efficiently located. In some instances, however, a solution to a particular problem may not be available, particularly of the particular problem has never arisen before. As such, processing a request for a solution may involve creating a solution of an existing solution is not found. FIG. 5 is a process flow diagram which illustrates one method of processing a request for corrective information from the point-of-view of a central system in accordance with an embodiment of the present invention. A method 501 of processing a request for corrective information begins at step 505 in which a central system receives a request for a corrective fix, e.g., a report of a problem, from a customer. The request may be received in the form of an alert and a report from the customer transmitted by the customer, or a device in a network associated with the customer, across a secure sockets layer (SSL), as will be appreciated by those skilled in the art. Alternatively, the request may be received via an e-mail from the customer or a phone call from the customer.

Once the request for a corrective fix is received, the central system looks up the problem in a database in step 509. Looking up a problem may include, but is not limited to including, indexing into a table in a database using information relating to the problem, and determining whether the problem is catalogued in the table. After looking up the problem in the database, it is determined in step 513 if a solution to the problem was found. That is, it is determined if a corrective information relating to the problem was found in the database. If it is determined that a solution to the problem was found in the database, the solution is provided or otherwise distributed in step 529 to appropriate parties. In one embodiment, the solution is provided to the appropriate customers using an e-mail mechanism. Typically, the appropriate parties includes the customer that requested the fix, and may include other customers, e.g., customers that have devices or computer systems which are similar to the device or computer system of the customer that requested corrective information or a fix. Although the appropriate parties may be customers with networks that include devices, it should be appreciated that the appropriate parties may instead be the devices themselves. That is, the solution may either be provided to a customer such that the customer may identify and distribute the solution to appropriate devices, or the solution may be provided to the appropriate devices themselves. The processing of a request for corrective information is completed upon providing the solution to appropriate parties.

Alternatively, if it is determined in step 513 that no solution of the problem was found, the indication is that a solution to the problem is to be created, as for example by a system administrator associated with the central system. As such, process flow moves from step 513 to step 517 in which the system administrator creates or otherwise obtains a solution to the problem, e.g., from an external source. In one embodiment, obtaining a solution to the problem may include effectively commissioning a solution from technical specialists or system developers.

Upon creating or otherwise obtaining a solution to the problem, the solution is provided to appropriate parties in step 521 using e-mail. As the solution was not found in the database and was, instead, either developed or identified from a different source, the central system may optionally add the solution to the database in step 525. Adding the solution to the database may include, but is not limited to including, storing identifying information for the problem in addition to the solution such that the solution is associated with the problem. The processing of a request for corrective information is completed either after the solution is provided to appropriate parties or after the solution is added to the database.

Although only a few embodiments of the present invention have been described, it should be understood that the present invention may be embodied in many other specific forms without departing from the spirit or the scope of the present invention. By way of example, when a central or reseller system does not have a solution to a particular problem, the central system has been described as developing or otherwise obtaining a suitable solution. Obtaining a suitable solution may, in one embodiment, include contacting a manufacturer or original seller of the central system to request a solution.

Corrective information has generally been described as being corrective configuration information. However, corrective information is not limited to including corrective configuration information. In general, corrective information may include substantially any corrective policy that may be implemented on devices, as for example networking devices or IP phones, at customer sites. Additionally, substantially any information, corrective or otherwise, may be distributed using the methods described above. For example, updates may be distributed through e-mail to customer devices which may derive a benefit from the updates.

While a central system has been described as being suitable for broadcasting corrective information such as a fix to various customer systems, the ability to broadcast corrective information is not limited to being associated with a central system. For instance, one customer may receive corrective information and then transmit or otherwise provide that corrective information to at least one other customer.

An e-mail mechanism has been described as being suitable for transmitting corrective information to customers. It should be appreciated, however, that corrective information is not limited to be transmitted by an e-mail mechanism or system. Substantially any suitable mechanism or system that enables corrective information to be distributed, e.g., automatically, to customer systems may be used to distribute the corrective information. Other suitable mechanisms include, but are not limited to including, mechanisms that do not utilize a dedicated VPN connection between a central system and a customer site, such as an auto-polling mechanism which allows a customer site to automatically poll a central system for fixes.

In general, an e-mail may be substantially automatically generated when corrective information is identified. For instance, when a corrective fix is identified for a particular problem, an e-mail may be substantially automatically created and sent. In one embodiment, an e-mail may manually created and sent, e.g., by a network administrator. That is, an e-mail is not limited to be substantially automatically generated.

Further, the selection of appropriate customers or recipients for receiving corrective information may be either substantially automatic or manual. An automatic search of configuration information associated with customer devices, e.g., information stored in a database, may be performed to identify devices which may benefit from receiving the configuration information. A manual search, on the other hand, may be performed by a network administrator to locate devices which may benefit from receiving the configuration information.

For an embodiment in which a corrective fix is substantially immediately sent only to a requestor, i.e., a customer that reported an issue, other customer sites may receive the corrective fix at a later time. For example, all corrective fixes sent out by a central system within a particular time period may be collected or otherwise accumulated, and sent to substantially all customers at a certain time, or after a certain number of corrective fixes is accumulated.

The steps associated with the methods of the present invention may vary widely. Steps may be added, removed, altered, combined, and reordered without departing from the spirit of the scope of the present invention. By way of example, although the receipt of a broadcast by a customer has been described, the customer may receive an e-mail that is not part of a broadcast. That is, a customer may receive corrective information in an e-mail that is addressed substantially only to the customer and to no other customers. Therefore, the present examples are to be considered as illustrative and not restrictive, and the invention is not to be limited to the details given herein, but may be modified within the scope of the appended claims.

What is claimed is:

1. A method comprising:
   determining if an issue is reported by a first customer system, the first customer system being arranged to support at least a first device, wherein the issue is associated with the first device;
   determining if updating information relevant to the issue is available if it is determined that the issue is reported by the first customer system, the updating information including corrective configuration information;
   obtaining the updating information if it is determined that the issue is reported by the first customer system and if the updating information is available;
   providing the updating information in an e-mail message provided to the first customer system if it is determined that the issue is reported by the first customer system and if the updating information is available, the updating information being inlined into a body of the e-mail message as text, wherein the first customer system is arranged to distribute the updating information to at least the first device and to cause the first device to be updated with the updating information;
   creating new updating information if it is determined that the issue is reported by the first customer system and if the updating information is not available; and
   providing the new updating information to the first customer system after creating the new updating information if it is determined that the issue is reported by the first customer system and if the updating information is not available.

2. The method of claim 1 wherein providing the updating information in an e-mail message to the first customer system includes automatically generating the e-mail message and sending the e-mail message to the first customer system.

3. The method of claim 1 wherein determining if the issue is reported by the customer system includes determining if the issue is directly reported by the first device.

4. The method of claim 1 wherein the updating information is arranged to resolve the issue when implemented by the first device.

5. The method of claim 1 wherein the first device has a first configuration, and the method further includes:
   determining if a second customer system is arranged to support at least a second device, the second device having the first configuration; and
   providing the updating information to the second customer system if it is determined that the second customer system is arranged to support at least the second device, wherein the second customer system is arranged to distribute the updating information to at least the second device and to cause the second device to be updated with the updating information.

6. The method of claim 5 wherein providing the updating information to the first customer system and providing the updating information to the second customer system includes sending the e-mail message to the first customer system and the second customer system.

7. The method of claim 1 wherein the first customer system is included in a plurality of customer systems, and wherein providing the updating information to the first customer system includes broadcasting the e-mail message that contains the updating information to the plurality of customer systems.

8. The method of claim 1 wherein determining if the updating information relevant to the issue is available includes indexing into a table using information associated with the issue and determining if the updating information is catalogued in the table.

9. The method of claim 8 further including:
   adding the new updating information into the table.

10. A method comprising:
    determining if an issue is reported by a first customer system, the first customer system being arranged to support at least a first device, wherein the issue is associated with the first device;
    determining if updating information relevant to the issue is available if it is determined that the issue is reported by the first customer system, the updating information including corrective configuration information;
    obtaining the updating information if it is determined that the issue is reported by the first customer system and if the updating information is available; and
    providing the updating information in an e-mail message provided to the first customer system if it is determined that the issue is reported by the first customer system and if the updating information is available, the updating information being provided in a link in the e-mail message to a location at which the updating information is stored, wherein the first customer system is arranged to distribute the updating information to at least the first device and to cause the first device to be updated with the updating information.

11. Executable logic encoded in one or more non-transitory, computer readable media for execution and when executed operable to:
    determine if an issue is reported by a first customer system, the first customer system being arranged to support at least a first device, wherein the issue is associated with the first device;
    determine if updating information relevant to the issue is available if it is determined that the issue is reported by the first customer system, the updating information including corrective configuration information;

obtain the updating information if it is determined that the issue is reported by the first customer system and if the updating information is available;

provide the updating information in an e-mail message provided to the first customer system if it is determined that the issue is reported by the first customer system and if the updating information is available, the updating information being inlined into a body of the e-mail message as text, wherein the first customer system is arranged to distribute the updating information to at least the first device and to cause the first device to be updated with the updating information;

create new updating information if it is determined that the issue is reported by the first customer system and if the updating information is not available; and provide the new updating information to the first customer system after creating the new updating information if it is determined that the issue is reported by the first customer system and if the updating information is not available.

12. The executable logic of claim 11 wherein the executable logic operable to provide the updating information in an e-mail message to the first customer system is further operable to automatically generate the e-mail message and to send the e-mail message to the first customer system.

13. The executable logic of claim 11 wherein the executable logic operable to determine if the issue is reported by the customer system includes executable logic operable to determine if the issue is directly reported by the first device.

14. The executable logic of claim 11 wherein the updating information is arranged to resolve the issue when implemented by the first device.

15. The executable logic of claim 11 wherein the first device has a first configuration, and the executable logic is further operable to:

determine if a second customer system is arranged to support at least a second device, the second device having the first configuration, wherein the issue is associated with the first device; and provide the updating information to the second customer system if it is determined that the second customer system is arranged to support at least the second device, wherein the second customer system is arranged to distribute the updating information to at least the second device and to cause the second device to be updated with the updating information.

16. The executable logic of claim 15 wherein the executable logic operable to provide the updating information to the first customer system and to provide the updating information to the second customer system is further operable to send the e-mail message to the first customer system and the second customer system.

17. The executable logic of claim 11 wherein the first customer system is included in a plurality of customer systems, and wherein the executable logic operable to provide the updating information to the first customer system is further operable to broadcast the e-mail message that contains the updating information to the plurality of customer systems.

18. An apparatus comprising:

means for determining if an issue is reported by a first customer system, the first customer system being arranged to support at least a first device;

means for determining if updating information relevant to the issue is available if it is determined that the issue is reported by the first customer system, the updating information including corrective configuration information;

means for obtaining the updating information if it is determined that the issue is reported by the first customer system and if the updating information is available;

means for providing the updating information in an e-mail message provided to the first customer system if it is determined that the issue is reported by the first customer system and if the updating information is available, the updating information being inlined into a body of the e-mail message as text, wherein the first customer system is arranged to distribute the updating information to at least the first device and to cause the first device to be updated with the updating information;

means for creating new updating information if it is determined that the issue is reported by the first customer system and if the updating information is not available; and means for providing the new updating information to the first customer system after creating the new updating information if it is determined that the issue is reported by the first customer system and if the updating information is not available.

* * * * *